Oct. 28, 1958  F. SOLOMON  2,858,352
SEPARATORS FOR ELECTRIC BATTERIES
Filed March 8, 1955
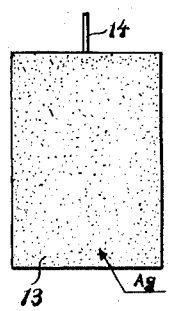
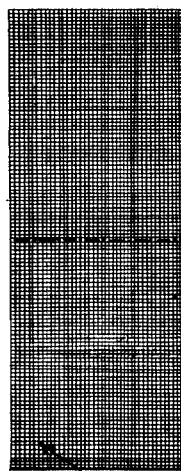
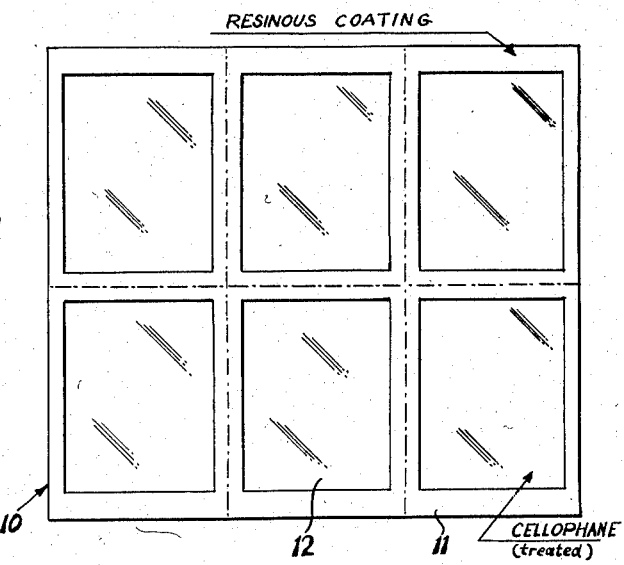
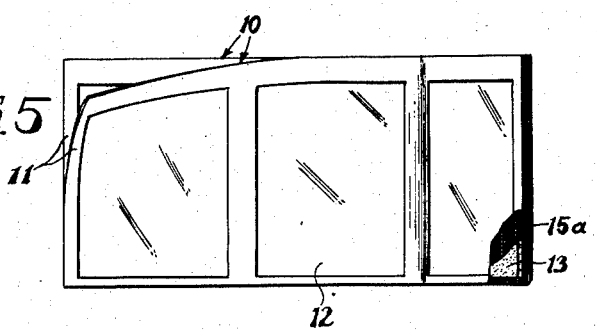
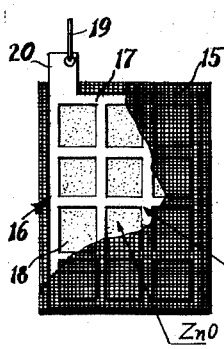
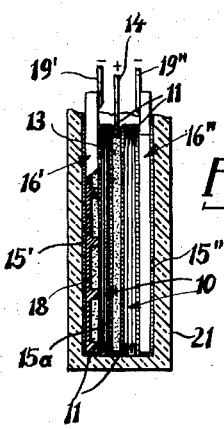
FRANK SOLOMON
INVENTOR
BY Karl F. Ross
AGENT

United States Patent Office 2,858,352
Patented Oct. 28, 1958

2,858,352
SEPARATORS FOR ELECTRIC BATTERIES

Frank Solomon, Jackson Heights, N. Y., assignor to Yardney International Corp., New York, N. Y., a corporation of New York Application March 8, 1955, Serial No. 492,953

5 Claims. (Cl. 136—145)

My present invention relates to separators for electric batteries, more particularly (but not exclusively) for alkaline batteries or accumulators of the rechargeable silver-zinc type.

In batteries of this and related types it is known, in accordance with the teachings of U. S. Patent No. 2,594,709, issued April 29, 1952, to Henri André, to provide semi-permeable separators of, for example, regenerated cellulose (cellophane) positioned under pressure between adjacent electrodes of opposite polarities. The resulting close contact between the separator material and a powerful oxidizing agent, such as silver peroxide $Ag_2O_2$ present at the positive electrode or electrodes in the charged condition of the battery, as well as the presence of other active substances causes topochemical oxidation and possibly other structural changes of the cellulosic sheets forming the separator, thereby tending to weaken same and to make it more readily penetrable by migrating metal ions and metallic growths which would eventually short-circuit the battery. Remedies previously proposed include, besides the obvious expedient of increasing the number of cellophane layers (at the cost of greater weight, volume and internal resistance), the interposition of porous spacers (e. g. of filter-type or other paper) between the semi-permeable material and the electrodes as disclosed in my co-pending application Serial No. 285,785, filed May 2, 1952, and now abandoned; these arrangements, while generally satisfactory, have up to now not proved effective to extend the useful life of a battery to anything approaching that which is believed to be the theoretical ultimate consistent with low weight, volume and internal resistance.

The broad object of the present invention is to provide means for more effectively protecting a semi-permeable separator material from harmful topochemical attack without objectionably increasing the dimensions and the internal resistance of a battery incorporating such separator material.

The above object may be realized, according to the invention, by providing a protective shield of oxidation-resistant material adjacent the semi-permeable material.

According to my invention the protective shield is substantially electrolyte-impermeable but is applied only or mainly to those regions of the separator which are not in direct or indirect high-pressure contact with the electrodes and which are, therefore, more or less exposed to the corrosive action of air and gases within the battery casing. The shield in that case advantageously takes the form of a coating (preferably applied by printing) of waterproofing synthetic-resin material adhering to the marginal portions of the separator member. The protective material is preferably of a type not readily wettable by the electrolyte (which may be potassium hydroxide with a large concentration of potassium zincate) so as to minimize the danger of chemical attack upon the coating. Suitable materials for this coating include various thermoplastics such as methyl methacrylate, polyvinyl acetate, polystyrene, and copolymers of polyvinyl acetate with polyvinyl chloride, polystyrene with butadiene, and polystyrene with acrylonitrile.

The invention will be further described with reference to the accompanying drawing in which:

Fig. 1 shows a sheet of treated cellophane with protective marginal coating, to be used as a separator in accordance with the present invention;

Fig. 2 shows a positive electrode designed to be enveloped by the sheet of Fig. 1;

Fig. 3 shows an oxidation-resistant porous spacer according to the invention;

Fig. 4 show a negative electrode wrapped in the spacer of Fig. 3;

Fig. 5 illustrates a step in the process of wrapping the sheet of Fig. 1 around the electrode of Fig. 2; and Fig. 6 shows a battery casing containing an electrode-separator assembly according to the invention.

Fig. 1 shows a sheet 10 of cellophane which may have been treated by any of the processes set forth above. Strip portions 11 of this sheet are coated with a waterproofing resin of the character set forth above. These portions are so arranged as to leave windows 12 which will be substantially coextensive with the major faces of an electrode when the sheet 10 is wrapped around the same as illustrated in Fig. 5.

Fig. 2 shows an electrode 13 of sintered silver (e. g. as disclosed in co-pending application Serial No. 174,076, filed July 15, 1950, by Martin E. Kagan and Frank Solomon) having a positive conductor 14 projecting therefrom. Fig. 3 shows a fabric 15, woven from artificial fibers, which in Fig. 4 is seen wrapped around a negative electrode 16; the latter electrode comprises a substantially inert frame 17 (e. g. of magnesium), active material 18 packed into recesses of said frame, and a negative conductor 19 secured to a lug integral with the frame, indicated at 20. It may be mentioned that the raised portions of the frame or grid 17, which are to come into contact with the spacer 15, may be provided with an insulating coating, e. g. similar in composition to the coating 11, whereas the depressed portions in contact with the active material 18 may have been rendered more highly conductive by suitable treatment, e. g. by a zinc-copper-zinc plating process known per se; no claim is made herein to any electrode construction inasmuch as the same forms no part of the present invention directed to an inter-electrode separator.

The dotted lines in Figs. 1 and 3 indicate the lines along which the members 10 and 15 are to be folded around an electrode, e. g. in the manner shown in Fig. 5. There the positive electrode 13 is first enfolded by a web or fabric 15a, substantially identical with the fabric 15 of Fig. 3, after which it is placed inside the sheet 11 adjacent one of the windows 12 thereof, the sheet being thereupon folded about its horizontal and vertical crease lines (all of which have been provided, on both sides of the sheet, with the waterproof coating 11) so as to place three layers of treated cellophane on each side of the electrode plate 13. It will be understood that this procedure will place the coatings 11 in substantially aligned marginal positions all around the electrode 13; this is clearly apparent in Fig. 6 where the positive electrode 13 with its wrapper 15a and cellophane envelope 10, flanked by two negative electrodes 16', 16" with woven wrappers 15', 15", is shown inserted into a tightly fitting casing 21 with the negative electrodes so positioned that their active materials 18 face the positive electrode, sandwiched between them, across the windows 12. The positive and the negative leads are indicated in Fig. 6 at 14 and at 19', 19'', respectively.

It will, of course, be understood that the positioning of an electrode plate such as 13 in a sheet such as 10 may be different from that shown and that, for example, two such plates may be inserted into the sheet which may then be folded into U-shape, with one plate in each arm of the U, e. g. as described in U. S. Patent No. 2,610,219.

It will thus be seen that with the arrangement of Fig. 6, upon the introduction of an electrolyte into the casing 21, the uncoated portions of the cellophane separator 10 will be compressed between the electrodes on account of the swelling of the cellophane when the latter is permeated by the alkaline solution, and that all portions of this separator which project beyond the electrode assembly, and are therefore not subject to such compression, are provided with the protective coating 11 which effectively makes the cellophane substantially inaccessible to air and gases. A battery rechargable a large number of times, capable of prolonged storage without material deterioration of its separators, and having a low internal resistance is thereby obtained.

I claim:

1. In a battery, in combination, a casing, an electrolyte in said casing, an electrode assembly in said casing at least partially submerged in said electrolyte, said assembly including a sheet of electrolyte-permeable separator material having an upper edge portion projecting above said electrolyte, and protective means forming a substantially impermeable oxidation-resistant zone on all of said projecting upper edge portion.

2. The battery according to claim 1, wherein said protective means includes a resinous coating.

3. In a battery, in combination, a casing, an alkaline electrolyte in said casing, an electrode assembly in said casing at least partially submerged in said electrolyte, said assembly including at least one silver-containing positive electrode and at least one zinc-containing negative electrode and a sheet of semi-permeable separator material having an upper edge portion projecting above said electrolyte, and protective means forming a substantially impermeable oxidation-resistant zone on all of said projecting upper edge portion.

4. In a battery, in combination, an electrolyte, a positive electrode and a negative electrode immersed in said electrolyte, a sheet of electrolyte-permeable material between said electrodes having an upper edge projecting above said electrolyte, a waterproofing coating on portions of said sheet including said upper edge, said coating leaving at least one window of substantially the size of one of said electrodes, said sheet enveloping said one of said electrodes in a manner placing said window in contact with a major face of said electrode while letting only coated portions of said sheet project beyond the electrode, and means externally urging the other of said electrodes against said window.

5. The combination according to claim 1, wherein said electrolyte-permeable material is cellulosic material.

References Cited in the file of this patent

UNITED STATES PATENTS

| 1,470,518 | Yarnell | Oct. 9, 1923 |
| 2,490,630 | Jardine | Dec. 6, 1949 |
| 2,610,219 | Yardeny | Sept. 9, 1952 |
| 2,687,445 | Merrill | Aug. 24, 1954 |

FOREIGN PATENTS

| 751,398 | France | Sept. 2, 1933 |